Patented May 5, 1936

2,040,000

UNITED STATES PATENT OFFICE 2,040,000

DISPERSION OF SYNTHETIC RESINS IN LIQUIDS

Horatio Whitehead Hutton, East Croydon, England

No Drawing. Application April 17, 1934, Serial No. 721,066. In Great Britain April 19, 1933

2 Claims. (Cl. 134—26)

This invention is for improvements in or relating to the dispersion of synthetic resins in liquids and has particular reference to the dispersion of phenolic resins which are formed by a two or more step process in the treatment of phenols with formaldehyde to produce condensation products as (a) a soluble and fusible product, (b) an insoluble and fusible product and (c) an insoluble and infusible product, the last stage in the process being brought about by heat or light on (a) or (b) with or without pressure. Such a phenolic synthetic resin is hereinafter referred to as a synthetic resin of the type described, and the term "infusible" implies that final polymerization is complete.

In the past it has been known that synthetic resins could be dispersed in liquids including water and that protective colloids or dispersion accelerators such as fatty acids, gums, glue, gelatine and casein assisted in maintaining homogeneity and the compound so made would hold and retain colour, mineral or otherwise and could be employed for waterproofing either with coagulating agents or as an after coating or without. Dispersions of synthetic resins so made lack stability and even with colloid grinding require agitation prior to or during use.

Homogeneous dispersions of a very stable character which requi ̃ no colloid grinding after dispersion and which are suited for a wide variety of uses may be obtained according to my invention which consists in a process for the manufacture of liquid dispersions of synthetic resins of the type which may be obtained both in fusible and infusible forms and which consists in incorporating with the resin or resins a stabilizer or stabilizers and saponified or saponifiable natural or sulphonated oils or fats, saponifying the oils or fats if not already saponified and finally adding the diluent. The soluble resins either in the fusible or infusible forms are preferably pre-precipitated prior to their incorporation. The incorporation of the resins and emulsification of the saponifiable bodies may be effected in the cold, but I geneally prefer to carry out my process at temperatures approximately at the boiling point of water.

The object of the present invention is to produce a liquid product of variable but low viscosity which is capable of application as a paint or applied surfacing material or binding agent to materials with the after application of heat with or without pressure or as an impregnating product for fabrics, ceramics and like articles or if colouring agents or fillers be applied to the product, the product can be used for treatment of ceramics, fabrics and the like for their decoration as well as for their preservation, or of giving them qualities after heat or light treatment not otherwise inherent such as being waterproof, acid, alkali and fire resisting or of surfacing, enamelling or polishing them or imparting to them the quality of adhesion.

The present invention comprises a process for the dispersion or emulsification in a liquid of a synthetic resin and more particularly the phenolic synthetic resins of the type described and embraces the treatment of the resinous material which has not yet reached its infusible form either in its liquid state or at a state below the temperature level at which it is converted to a water insoluble and infusible form, and mixing such resin with an emulsifying agent and a stabilizer, and if desired with a diluent, to the liquid in which the dispersion is to take place.

The process is further characterized that it may be processed without the addition of applied heat, though most of the processes are accelerated if heat up to that of boiling water be used. Excessive heat tends partially to pre-polymerize the resin in either (a) or (b) form and spoils the product.

In an alternative form of the process the resinous material selected and preferably that in liquid or pasty form (type (a)) may first be treated with strong caustic alkali and water which creates solution and the resin precipitated by acidulation, and the resulting resinous product then submitted to the process described above.

The synthetic resin may consist, for example, of a phenol formaldehyde resin in the (a) or (b) stage, that is to say in the soluble and fusible state or in the insoluble but fusible condition, thus state or in the insoluble but fusible condition, thus according to the nature of the synthetic resin so the process may for commercial reasons vary.

In carrying this invention into effect and in the preferred manner and according to the process for the treatment of phenolic synthetic resin in powered form which has not reached the infusible stage (state (b)) the resin is first mixed with a liquid such as colza mineral oil, commercial liquid paraffin or petroleum. Thereafter this admixture is subjected to the addition of sulphonated rape, sperm, cod, castor or other oil mixed as desired with oleic acid and cyclohexanol and to this is added a suitable proportion of caustic alkali depending upon the fatty acid or its equivalent employed. The dispersion medium is preferably water but if desired it may be an organic liquid such as a light mineral oil or spirit.

It is desirable to mix the resin and the dispersion medium when the latter is hot and the mixing may be assisted by mechanical stirring or by the aid of emulsifying machinery.

After the emulsification has taken place or during the period of emulsification it is desirable to add a definite quantity of colloid stabilizing material such as glue, gum tragacanth or the like in the event of water being the diluent or shellac or kindred material if spirit or like organic liquids are used as diluents. When this further admixture has taken place, the liquid dispersion obtained may then be loaded with a filler such as starch, colloidal clays, metal powders or solid or soluble pigments. Colouring matter may be employed and be added at any stage depending upon the colour required to be produced and the colouring matter used.

The following is a description by way of example of one method of carrying the present invention into effect.

45 parts by weight of phenol-formaldehyde condensation resin in the (b) stage (powdered but fusible) are heated with 5 parts of commercial liquid paraffin, copious stirring taking place. To this are added whilst stirring takes place 5 parts by weight of washed sulphonated sperm oil (25% by weight sulphonation), 5 parts oleic acid, 1 part cyclohexanol, and to this are gradually added 45 parts by weight of boiling water with the addition of sufficient alkali either in the form of triethanolamine (trihydroxyethylamine) or caustic alkali until saponification of the fatty acids has completely or sufficiently taken place. As a guide to the degree of saponification necessary it may be remarked that complete saponification of the fatty acids employed is not essential but a definite degree of saponification is necessary, and with the mixture above given a quantity of caustic alkali amounting to between 4 to 9 parts by weight of 32° Twaddell would be sufficient to create the degree of saponification necessary.

The sulphonated oil may be merely washed or may be first neutralized with caustic alkali or with the carbonates or borates of alkali metals. As a stabilizing agent for the aqueous solution provided above up to 2½% by weight of Scotch commercial skin glue is preferably employed and this is added as an aqueous solution as stirring takes place of the above ingredients.

The above description of the process is intended to operate on a batch system but the process may be made continuous by running into a hot dispersion or emulsion of resin an aqueous solution of an emulsifier and a stabilizer, stirring taking place during the admixtures.

According to a modified form of the invention and dealing for example with a phenol-formaldehyde synthetic resin in the (a) stage, i. e. a resin in liquid form which is both soluble and fusible, this is dissolved in caustic alkali and the solution diluted with water and the resin precipitated in such solution in finely divided form by the addition of an acid that is to say an acidic gas or a mineral or vegetable acid, until the solution is neutralized.

The resin recovered may be dispersed or emulsified in an aqueous medium in the presence of emulsifying and stabilizing agents. The emulsifying agent as before may conveniently consist of a soap or a higher fatty acid, e. g. oleic acid, a higher fatty acid, i. e. oleine with triethanolamine (trihydroxyethylamine) or mixtures of these or allied substances. Fillers or diluents may be introduced into the dispersion or emulsion in the course of or after its preparation. Thus, in addition to those mentioned above, according to the process first described, emulsified bitumen, waxes, rubber-latex or hydrocarbon oils can be used.

The following is a description by way of example of a method of preparing an emulsion in accordance with the present invention employing with liquid phenolic synthetic resins (state (a)) set out above.

20 lbs. of commercial oleic acid, 4–5 lbs. of triethanolamine (trihydroxyethylamine), 50 lbs. water and 5 lbs. of Scotch skin glue are mixed together and heated to boiling point of water. To the hot mixture is added with efficient stirring 100 lbs. of the synthetic resins (stage (a)) either raw or after same has been precipitated as above described. The resin melts and emulsifies in the liquid and after the resin has become evenly suspended in the liquid an equal volume of water is added, together, if desired, with a proportion of a filler such as clay.

The product produced by means of the above invention is a mobile liquid which can be used for the purpose of impregnation and the materials treated may be then subjected to heat and pressure or heat only for the purposes of polymerizing the liquid coating or impregnation. Thus textiles, fibres or like fabrics or fabric making materials may be impregnated with the emulsion and the diluent evaporated therefrom and then heat treated.

Further, the dispersions or emulsions prepared as above described may be employed as adhesives or for impregnating surfaces or binding porous materials by applying the dispersion or emulsion product to the material, removing the bulk of the water or diluent from the dispersion or emulsion and then applying sufficient heat to convert the dispersed resin into the infusible and insoluble condition.

If the emulsion or dispersion is made from the powder form of resin (stage (b)) then the tendency for the aqueous dispersion or emulsion is to dry with a dry non-tacky surface, but if on the other hand the dispersion or emulsion is made from the soluble but infusible form of resin (stage (a)), then the surface remains tacky and adhesive for some time, but the application of heat will render this material inert and allied to the other form as well as being fire-resisting and impervious to water.

If the product be applied as by spraying or painting to walls, tiles, roofs, thatch, or other surfaces exposed to the sun's light and heat, evaporation of the diluent takes place and polymerization of the product gradually ensues.

If the filling material be of light gravity it will remain in suspension and will equally spread with the product when the latter is applied. When, however, bronze powders, metal dust or heavy earth oxides are employed their suspension will depend upon the viscosity of the product. If the product is diluted they will tend to settle out in process of time but in any case will remain sufficiently long in suspension after stirring to be evenly distributed if application takes place immediately after stirring.

When the product of the invention is applied as an adhesive, the material superimposed upon the applied layer may be ironed hot, the pressure compelling complete contact and impregnation of both contiguous surfaces, the heat of the iron dissipating the diluent and polymerizing the product. After this operation the adhesion is generally greater than the innate strength of the materials united.

Should the liquid dispersion of resin when dried and after its heat treatment be brittle or tend to be brittle a plasticizer may be used and as an example of a suitable material for this purpose, the addition of castor oil may be mentioned.

I claim:

1. In the manufacture of a liquid containing a dispersed resin, the process of treating a phenol formaldehyde resin with paraffin, sulphonated sperm oil and a fatty acid and intimately intermixing them therewith, adding boiling water to the mixture in an amount approximately equal to the weight of the resin, said water being rendered sufficiently alkaline to saponify substantially all of the fatty acids present in the mixture, to thereby create a nascent saponification in situ and intimately disperse soap molecules throughout said mixture, and then incorporating a diluent with said mixture.

2. In the manufacture of a liquid containing a dispersed resin, the process of treating a phenol formaldehyde resin with paraffin, sulphonated sperm oil, a fatty acid and cyclohexanol, and intimately intermixing them therewith, adding boiling water to the mixture in an amount approximately equal to the weight of the resin, said water being rendered sufficiently alkaline to saponify substantially all of the fatty acids present in the mixture, to thereby create a nascent saponification in situ, incorporating a stabilizer with said mixture and then adding an aqueous diluent to said mixture.

HORATIO WHITEHEAD HUTTON.